May 6, 1952 F. S. STERNAD 2,595,423
TIRE BUILDING APPARATUS
Filed July 2, 1949
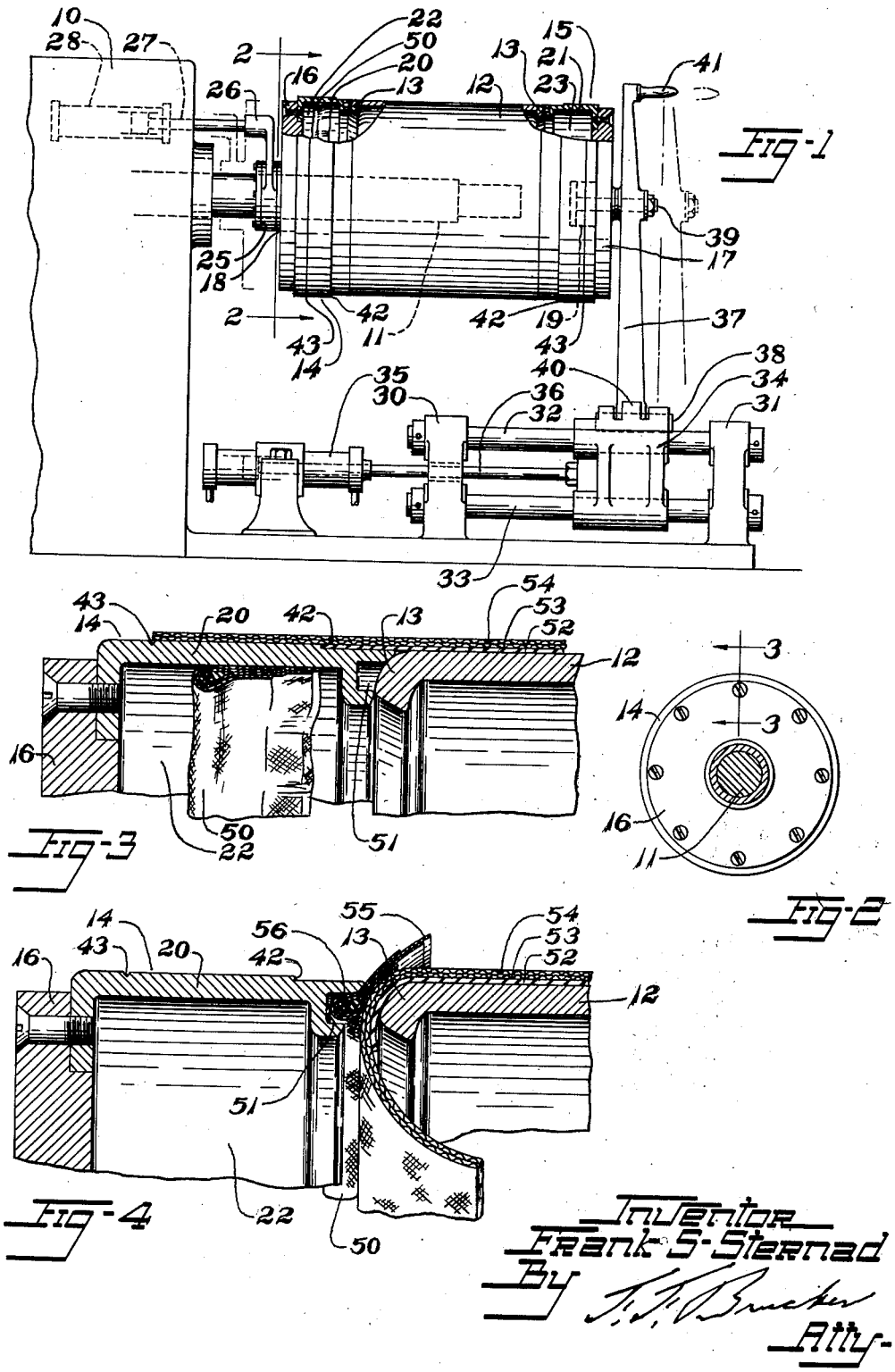
Inventor
Frank S. Sternad
By
Atty.

Patented May 6, 1952

2,595,423

UNITED STATES PATENT OFFICE 2,595,423

TIRE BUILDING APPARATUS

Frank S. Sternad, Cuyahoga Falls, Ohio, assignor to The B. F. Goodrich Company, New York, N. Y., a corporation of New York Application July 2, 1949, Serial No. 102,829

10 Claims. (Cl. 154—9)

This invention relates to tire building apparatus and is particularly useful in the building of tires having high turn-up of the carcass plies.

In the manufacture of tire carcasses it has been customary to wind plies of cord fabric about a relatively flat faced collapsible former or drum. Bead cores enclosed by narrow plies of fabric known in the art as flipper strips have been applied at the margins of the drum and certain of the carcass plies have been turned up about the beads whereas other plies have had their margins turned down about the beads. The forming drum has been rotatably supported on the end of a shaft extending from a driving unit leaving one end of the drum exposed. While it has been relatively simple to apply the bead at the outboard end of the drum, it has been more difficult to support and apply the bead core at the inboard end thereof because it has been necessary to support the bead core about the driving shaft before the collapsible drum was adjusted to expanded shape for tire building.

Some tire carcasses have been designed in which the flipper strips have been quite wide in order to extend well outwardly of the side walls of the tire and it has been proposed to turn the under-bead plies of the tire carcass upwardly along the outer surface of the flipper strip providing a wide turn up of these plies. The width of the plies of such a tire have been so much greater than the width of the building drums as to require support of the margins overhanging the building drums and to involve difficulties in properly centering the plies. Furthermore, difficulties have been experienced in supporting the inboard flippered bead so that it would not interfere with the margins of the carcass plies.

The present invention aims to overcome the foregoing and other difficulties.

Objects of the invention are to provide a unitary support for the margins of fabric plies and the flippered beads, to provide for shielding of the flippered bead during laying of the carcass plies, and to provide for accurately placing the flippered bead.

These and other objects will appear from the following description and the accompanying drawings.

Of the drawings,

Fig. 1 is a front elevation of a tire building machine constructed in accordance with and embodying the invention, parts being broken away and parts shown in section.

Fig. 2 is a sectional view thereof, taken on line 2—2 of Fig. 1.

Fig. 3 is a sectional view thereof taken on line 3—3 of Fig. 2, showing the under bead carcass plies applied to the drum.

Fig. 4 is a similar view showing the under-bead carcass plies turned in and the flippered bead being applied.

Referring to the drawings, the numeral 10 designates a drive unit of a tire building machine having a rotatable shaft 11 extending therefrom. A flat-band type tire building drum 12 is mounted on shaft 11 for rotation therewith and is of the collapsible type well known in the art. Such a drum may be collapsed to permit removal of a tire carcass and when in use has a relatively flat face for supporting the carcass material. The ends of the drum face are curved slightly inwardly as at 13 and terminate slightly below the face at open ends.

For supporting margins of the carcass plies of material beyond the ends of the drum, and for supporting and placing annular flippered beads, a pair of material supporting extension members 14, 15 are provided, one adjacent each end of the drum 12. Each annular extension member comprises a disc 16 or 17 having a central bearing 18 or 19 for supporting it and having a peripheral flange 20 or 21 extending axially from the disc toward an end of the drum 12, the members being generally cup-shaped and enclosing an internal cavity 22 or 23.

Extension member 14 is slideably mounted on shaft 11 and has a shifter groove 25 in its bearing portion 18 for receiving a shifter fork 26. The fork 26 is fixed to the piston rod 27 of a fluid pressure operated cylinder 28 fixed to the machine with its axis parallel to that of shaft 11. The arrangement is such that member 14 may be moved toward or away from the drum by control of fluid to cylinder 28.

The drum 12 with the extension members 14, 15 provides a wide tire building support collectively providing a support for the wide plies required where a wide turn-up of the under-bead plies is required, and in effect providing a circumferentially divided drum in which the center section 12 is collapsible and the end sections 14, 15 are moveable toward and from the center section.

For controlling member 15, the base of the machine 10 extends beyond the drum 12 and has fixed thereto brackets 30, 31 to which are secured parallel rods 32, 33. A cross-head 34 is slideably mounted on the rods for movement axially of the drum 12. A fluid operated cylinder 35 is also mounted on the machine 10 and its piston rod 36 is attached to the cross head 34. An arm 37 is pivotally mounted on a shaft 38 secured to cross-head 34 for swinging movement, the shaft 38 being parallel to shaft 11. A stub shaft 39 is mounted on arm 37 and bearing 19 is rotatably mounted on the stub shaft 39. Stub shaft 39 and shaft 11 are normally held in alignment by engagement of the member 15 over the rounded margin of the drum 12 and pressure of the cross-head to the left of Fig. 1. When pressure in cylinder 35 is reversed, the member 15 is moved to the right and arm 37 may be swung about shaft 38 to a position where the member 15 clears the drum 12 at which position arm 37 engages a stop 40 on cross-head 34. A handle 41 is provided on arm 37 to manually control its swinging movement.

For gauging the position of the fabric about the drum 12 and the extension supporting members 14, 15 each of the members is provided with a circumferential marking such as a step or shoulder 42 against which the margin of the first ply of fabric may be aligned, and a groove 43 more removed from the drum for aligning a margin of the second ply of fabric. The outer diameters of the shoulder of the members are equal to the level of the plies so that the plies may be stitched thereover and the width of the member is sufficient to give good support to the margins of the plies.

The hollow cavity 22 is of such width as to exceed the width of the flippered bead 50 which may be inserted in the cavity by buckling it to compact its circumference. In the cavity it is out of contact with other rubberized materials and may be stored until it is to be applied to the drum.

The members 14, 15 are also used for supporting and positioning the flippered beads and for this purpose are each formed with an axially open circumferential groove 51 facing the drum 12. Each groove is of such radial width as to fit the flippered bead to support it with its skirt extending radially outward and toward the drum, as shown in Fig. 4.

In the operation of the apparatus, with the drum 12 collapsed and the members 14, 15 axially displaced therefrom, a flippered bead is inserted in the cavity 22 of member 14, and a similar bead may be placed within member 15 if desired. Drum 12 is then expanded to working condition. Cylinders 28 and 35 may then be energized to move the members 14, 15 into engagement with drums 12. In this position the drum 12 and the members provide a broad circumferentially divided building surface upon which the carcass plies 52, 53, 54 may be laid in succession and rolled or stitched together, the shoulders 42 and grooves 43 being used to center the plies.

The cylinders 28, 35 are then operated in the opposite direction to displace the members 14, 15 to positions removed from the carcass plies. Then the margins of the plies overhanging the drum 12 are turned radially inwardly as in Fig. 4.

The beads are then removed from cavities 22 and mounted in grooves 51. The cylinders 14, 15 are again reversed and advance members 14, 15 against the drum 12 adhering the beads to the carcass plies in the desired position.

The drum 12 is then rotated and the flipper strips 55 are rolled or stitched to the plies over drum 12. Members 14, 15 are then again retracted and the inturned margins of plies 52, 53, 54 are stitched outwardly over the beads 56 and over the portions of the plies on the drum 12.

The described construction has the advantages of properly centering and supporting wide plies of material while at the same time providing for storing the flippered beads so that they are not in the way and do not come in contact with other adhesive material, and the supporting and storing mechanism serves the additional purpose of properly positioning and setting the flippered beads.

Variations may be made without departing from the scope of the invention as it is defined by the following claims.

I claim:

1. Apparatus for building a tire carcass having flippered beads and a wide turn-up of under-bead carcass plies about the beads, said apparatus comprising a building drum, and a pair of extension members coaxial therewith, one at each end of the drum, said extension members each having a cylindrical wall providing a peripheral surface equal substantially in diameter to the diameter of the plies supported by the drum for supporting a margin of the carcass plies laid upon said drum during an initial tire-building step, means at said surfaces including circumferential guide markings for aligning the margins of said plies, each member having a cavity within said cylindrical wall open toward said drum of such axial depth as to provide for storage of a flippered bead during such initial step, and each member having an axially open groove in said wall about said cavity for supporting and positioning a flippered bead on said drum during a later tire-building step.

2. Apparatus for building a tire carcass having flippered beads and a wide turn-up of under-bead plies about the beads, said apparatus comprising a building drum, and a pair of extension members coaxial therewith, one at each end of the drum, said extension members being substantially flush with the plies laid on said drum and each having a stepped peripheral surface for locating and supporting a margin of the carcass plies laid upon said drum during an initial tire-building step, each member having a cylindrical wall defining a cavity open toward said drum of such axial depth as to provide for storage of a flippered bead during such initial step, and axially open grooves in said members in said walls about said cavities for supporting and positioning beads on said drum during a later tire-building step.

3. Apparatus for building a tire carcass having flippered beads and a wide turn-up of under-bead carcass plies about the beads, said apparatus comprising a building drum, a pair of extension members coaxial therewith, one at each end of the drum, and means for moving said extension members toward and from the drum, said extension members each having a cylindrical wall defining a peripheral surface substantially flush with the plies laid on said drum for supporting a margin of carcass plies laid upon said drum during an initial tire building step, said extension members each having a cavity inwardly of said wall open toward said drum of such axial depth as to provide for storage of a flippered bead during such initial step, and axially open grooves in said extension members at the margins of said walls about said cavities for supporting and positioning a flippered bead on said drum in a later tire-building step.

4. Tire-building apparatus comprising a tire-building drum having an annular face for receiving sheet tire materials upon said face and projecting over the end of said drum, an extension positionable in contact with said end of said drum and presenting an annular face substantially flush with said face of said drum for receiving the projecting portion of the materials applied to said drum and extension, said drum having an inwardly turned shoulder for supporting the sheet material formed thereabout, said extension being movable away from said end of said drum and from the projecting material leaving the latter free for working radially inward around said end of said drum about said shoulder, and means on said extension for locating and positioning an annular bead structure for assembly with material on said drum by axial movement of said extension.

5. Tire-building apparatus comprising a tire-building drum having an annular face for receiving sheet tire materials upon said face and projecting over the end of said drum, an extension positionable in contact with said end of said drum and presenting an annular face substantially flush with said face of said drum for receiving the projecting portion of the materials applied to said drum and extension, said drum having an inwardly-turned shoulder for supporting the sheet material formed thereabout, said extension being movable away from said end of said drum and from the projecting material leaving the latter free for working radially inward around said end of said drum, and said extension comprising an annular recess inwardly of said face thereof for temporarily storing a flippered bead therein, and locating means on said extension outwardly of said annular recess for supporting and positioning an annular bead structure for assembly with material on said shoulder of the drum by axial movement of said extension.

6. Tire-building apparatus comprising a tire-building drum having an annular face for receiving sheet tire materials upon said face and projecting over the end of said drum, an extension positionable in contact with said end of said drum and presenting an annular face substantially flush with said face of said drum for receiving the projecting portion of the materials applied to said drum and extension, said drum having an inwardly-turned shoulder for supporting the sheet material formed thereabout, said extension being movable away from said end of said drum and from the projecting material leaving the latter free for working radially inward around said shoulder of said drum, and an annular groove in said extension facing said drum for positioning a flippered bead to apply it to the material on said drum.

7. Tire-building apparatus comprising a tire-building drum having an annular face for receiving sheet tire materials upon said face and projecting over the end of said drum, an extension positionable in contact with said end of said drum and presenting an annular face substantially flush with said face of said drum for receiving the projecting portion of the materials applied to said drum and extension, said drum having an inwardly-turned shoulder for supporting the sheet material formed thereabout, said extension being movable away from said end of said drum and from the projecting material leaving the latter free for working radially inward around said shoulder of said drum, an annular groove in said extension in alignment with said shoulder of the drum for positioning a flippered bead to apply it to the material on said shoulder, and circumferential guide means on said extension for aligning material on said drum and extension.

8. Tire-building apparatus comprising a tire-building drum having an annular face for receiving sheet tire materials upon said face and projecting over the end of said drum, an extension positionable at said end of said drum and presenting an annular face substantially flush with said face of said drum for receiving the projecting portion of the materials applied to said drum and extension, said drum having an inwardly-turned shoulder for supporting the sheet material formed thereabout, said extension being movable away from said end of said drum and from the projecting material leaving the latter free for working radially inward around said shoulder of said drum, and a circumferential groove in said extension for aligning material on said drum and extension by abutment of a margin of the material against said shoulders.

9. Tire-building apparatus comprising a tire-building drum having an annular face for receiving sheet tire materials upon said face and projecting over the end of said drum, and extension positionable at said end of said drum and presenting an annular face substantially flush with said face of said drum for receiving the projecting portion of the materials applied to said drum and extension, said extension being movable away from said end of said drum and from the projecting material leaving the latter free for working radially inward around said end of said drum, and a circumferential groove in the face of said extension for aligning material on said drum and extension.

10. Tire-building apparatus comprising a tire-building drum having an annular face for receiving sheet tire materials upon said face and projecting over the end of said drum, and an extension positionable at said end of said drum and presenting an annular face substantially flush with said face of said drum for receiving the projecting portion of the materials applied to said drum and extension, said extension being movable away from said end of said drum and from the projecting material leaving the latter free for working radially inward around said end of said drum, said extension comprising an annular recess inwardly of said face thereof for temporarily storing a flippered bead therein and an annular groove outwardly of said recess facing said drum for positioning said bead to apply it to the material on said drum.

FRANK S. STERNAD.

REFERENCES CITED

The following references are of record in the file of this patent:

UNITED STATES PATENTS

| Number | Name | Date |
| --- | --- | --- |
| 678,175 | Haslam | July 9, 1901 |
| 684,305 | Pfund | Oct. 8, 1901 |
| 848,183 | Luke | Mar. 26, 1907 |
| 1,015,359 | Taylor | Jan. 23, 1912 |
| 1,753,973 | Slusher | Apr. 8, 1930 |
| 1,871,604 | Graham | Aug. 16, 1932 |
| 2,394,465 | McChesney | Feb. 5, 1946 |

FOREIGN PATENTS

| Number | Country | Date |
| --- | --- | --- |
| 175,067 | Great Britain | Feb. 10, 1922 |
| 331,073 | Great Britain | June 26, 1930 |